United States Patent
Harris et al.

(10) Patent No.: US 7,104,327 B2
(45) Date of Patent: Sep. 12, 2006

(54) METHODS OF FRACTURING HIGH TEMPERATURE SUBTERRANEAN ZONES AND FOAMED FRACTURING FLUIDS THEREFOR

(75) Inventors: Phillip C. Harris, Duncan, OK (US); Stanley J. Heath, Duncan, OK (US); Gary P. Funkhouser, Duncan, OK (US)

(73) Assignee: Halliburton Engery Services, Inc., Duncan, OK (US)

( * ) Notice: Subject to any disclaimer, the term of this patent is extended or adjusted under 35 U.S.C. 154(b) by 162 days.

(21) Appl. No.: 10/643,266

(22) Filed: Aug. 19, 2003

(65) Prior Publication Data

US 2005/0039919 A1    Feb. 24, 2005

(51) Int. Cl.
*E21B 43/267* (2006.01)

(52) U.S. Cl. .............. 166/308.5; 166/308.6; 507/224

(58) Field of Classification Search ......... 166/308.5, 166/270, 295, 308.6; 507/226, 224
See application file for complete search history.

(56) References Cited

U.S. PATENT DOCUMENTS

| | | | |
|---|---|---|---|
| 4,515,216 A | 5/1985 | Childs et al. ............... 166/293 |
| 4,524,828 A | 6/1985 | Sabins et al. ............... 166/293 |
| 4,578,201 A * | 3/1986 | Burns et al. ............... 507/226 |
| 4,582,139 A | 4/1986 | Childs et al. ............... 166/293 |
| 4,951,921 A * | 8/1990 | Stahl et al. ............... 166/270 |
| 5,007,481 A | 4/1991 | Williams et al. ............... 166/300 |
| 5,256,315 A | 10/1993 | Lockhart et al. ......... 252/8.551 |
| 5,407,909 A | 4/1995 | Goodhue, Jr. et al. ...... 507/118 |
| 5,759,964 A | 6/1998 | Shuchart et al. ............ 507/209 |
| 5,975,206 A | 11/1999 | Woo et al. ................... 166/300 |
| 6,242,390 B1 * | 6/2001 | Mitchell et al. ......... 166/308.5 |
| 6,245,252 B1 | 6/2001 | Hicks et al. ............... 252/8.05 |
| 6,454,008 B1 * | 9/2002 | Chatterji et al. ............ 166/308.6 |
| 6,488,091 B1 | 12/2002 | Weaver et al. ............. 166/300 |
| 6,986,391 B1 * | 1/2006 | Funkhouser et al. ..... 166/308.5 |
| 2004/0211568 A1 * | 10/2004 | Funkhouser et al. ..... 166/308.5 |

* cited by examiner

*Primary Examiner*—David Bagnell
*Assistant Examiner*—Matthew J. Smith
(74) *Attorney, Agent, or Firm*—Robert A. Kent; Baker Botts

(57) ABSTRACT

The present invention provides methods of fracturing high temperature subterranean zones and viscous aqueous foamed fracturing fluids therefor. A fracturing fluid of this invention comprises water, a terpolymer of 2-acrylamido-2-methylpropane-sulfonic acid, acrylamide and acrylic acid or salts thereof, a gas, a foaming agent and a viscosity breaker for effecting a controlled reduction in the viscosity of the fracturing fluid.

46 Claims, 1 Drawing Sheet

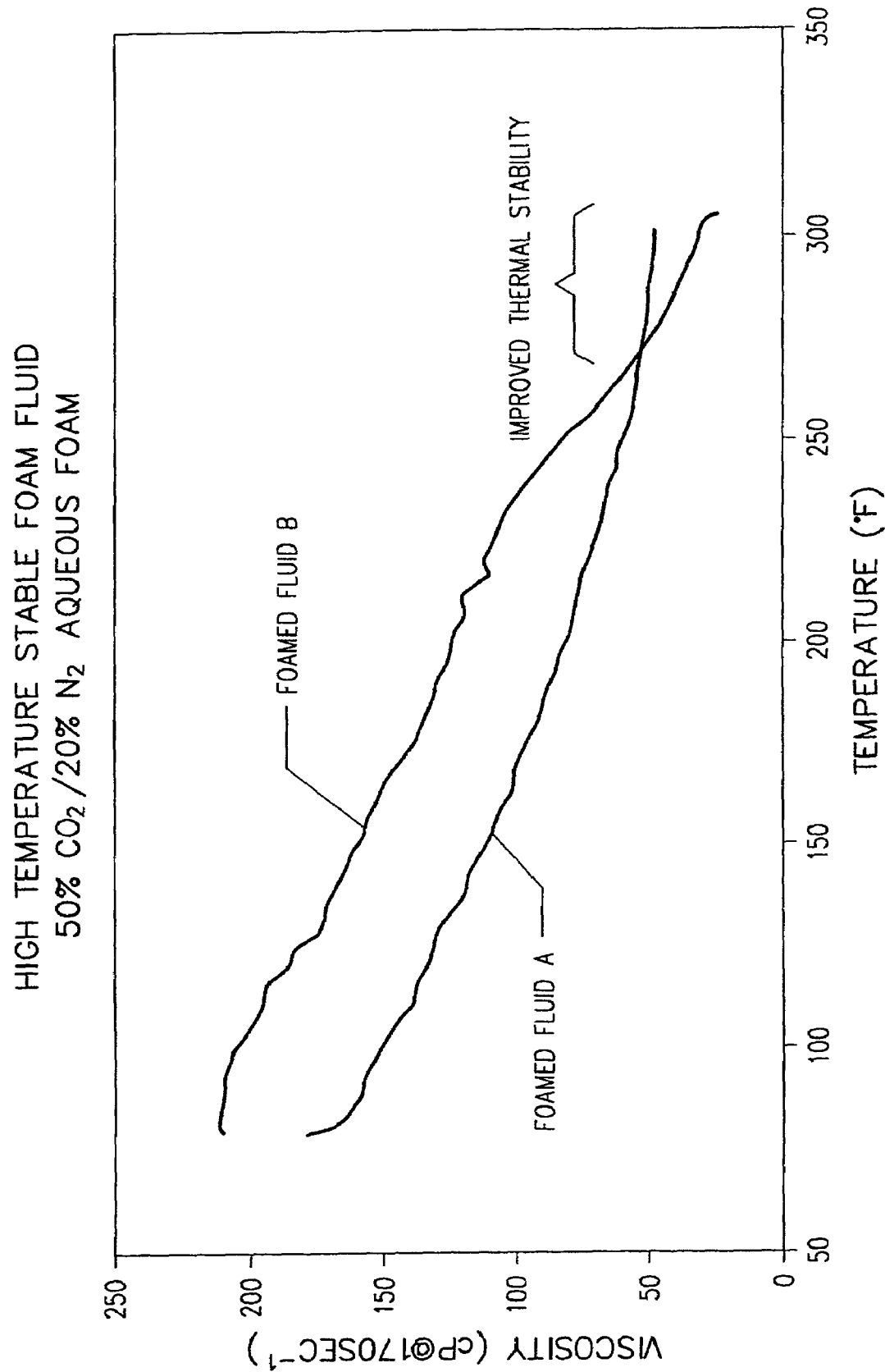

METHODS OF FRACTURING HIGH TEMPERATURE SUBTERRANEAN ZONES AND FOAMED FRACTURING FLUIDS THEREFOR

BACKGROUND OF THE INVENTION

1. Field of the Invention

The present invention relates to improved methods of fracturing high temperature subterranean zones and viscous aqueous foamed fracturing fluids therefor.

2. Description of the Prior Art

A treatment commonly utilized for stimulating hydrocarbon production from a subterranean zone penetrated by a well bore is hydraulic fracturing. In a hydraulic fracturing treatment, a viscous treating fluid, referred to in the art as a fracturing fluid, is pumped through the well bore into the subterranean zone to be stimulated at a rate and pressure such that fractures are formed and extended in the subterranean zone. A portion of the fracturing fluid has proppant particles suspended therein which are carried into and deposited in the formed fractures when the viscous fracturing fluid is broken and recovered. The proppant particles function to prevent the foamed fractures from closing whereby conductive channels are formed through which produced fluids can flow to the well bore. The breaking of the fracturing fluid, i.e., the reduction in the viscosity of the fracturing fluid whereby it can be recovered, is accomplished by adding a delayed breaker to the fracturing fluid prior to pumping it into the subterranean zone. The delayed breaker effects a controlled reduction in the viscosity of the fracturing fluid so that the proppant particles therein are deposited in the fractures and the fracturing fluid is recovered.

Viscous aqueous foamed fracturing fluids have been utilized heretofore. The benefits of using foamed fracturing fluids instead of non-foamed fracturing fluids are many including reduced leak off of the fracturing fluid into permeable formations, less damage to the subterranean zone being fractured as a result of polymer residue entering the zone permeability and/or the proppant particle packs formed in the fractures, and lower density of the fracturing fluid which facilitates the flow back of the fluid after its viscosity has been reduced.

The gases utilized in forming foamed fracturing fluids have primarily been nitrogen, carbon dioxide and mixtures thereof. Carbon dioxide becomes more economical to use in wells having greater depths and correspondingly higher temperatures and pressures. When nitrogen is utilized in a foamed fracturing fluid at high pressures, greater quantities of nitrogen must be compressed to maintain a high quality foam. Carbon dioxide, on the other hand, is pumped as a liquid or a very dense gas so that it does not require as much compression in high pressure wells as nitrogen. In addition, the density of carbon dioxide allows it to be pumped at lower well head pressures than nitrogen.

Carbon dioxide foamed fracturing fluids have heretofore been utilized in subterranean zones having temperatures up to about 400° F. However, the viscosity of a foamed fracturing fluid is dependent upon the liquid phase thereof and the viscous liquids utilized heretofore have generally been unstable at temperatures above about 300° F. Aqueous gelled liquids containing gelling agents such as guar, hydroxypropylguar and carboxymethylhydroxypropylguar lose viscosity by thermal thinning and become hydrolytically unstable above about 350° F. Also, at 350° F. and above, the heretofore used carbon dioxide foamed fluids have not had good proppant particle carrying capability.

Thus, there are continuing needs for improved carbon dioxide foamed fracturing fluids that maintain their viscosities at temperatures up to 400° F. and higher and have good proppant particle carrying ability.

BRIEF DESCRIPTION OF THE DRAWING

In the drawing, a graph of viscosity versus temperature is presented showing the stability of an aqueous foamed fracturing fluid of the present invention as compared to an aqueous foamed fracturing fluid of the prior art.

SUMMARY OF THE INVENTION

The present invention provides improved methods of fracturing subterranean zones and improved viscous aqueous foamed fracturing fluids that function at temperatures up to and above 400° F. and do not suffer from a lack of thermal stability, proppant particle carrying ability and the like. The viscous aqueous foamed fracturing fluids of this invention are basically comprised of water, a terpolymer of 2-acrylamido-2-methylpropane-sulfonic acid, acrylamide and acrylic acid or salts thereof, a gas, a foaming agent and a delayed viscosity breaker for effecting a controlled reduction in the viscosity of the fracturing fluid. The methods of the present invention are basically comprised of the steps of pumping a viscous aqueous foamed fracturing fluid as described above into a subterranean zone at a rate and pressure sufficient to fracture the zone and recovering the fracturing fluid from the zone.

As mentioned, the improved methods and foamed fracturing fluids of this invention can be utilized in subterranean zones having temperatures up to and above 400° F. while retaining good stability and proppant carrying capability. The foamed fracturing fluids of this invention are rapidly cross-linked using known cross-linkers and can be readily mixed on-the-fly. Further, the foamed fracturing fluids of this invention can be used without significant damage to the permeability of the fractured subterranean zone or proppant particle packs in the fractures, readily flow back after the viscosities of the fluids have been broken and are more economical to use at high temperatures and pressures.

The objects, features and advantages of the present invention will be readily apparent to those skilled in the art upon a reading of the description of preferred embodiments which follows.

DESCRIPTION OF PREFERRED EMBODIMENTS

The methods of this invention for fracturing a subterranean zone penetrated by a well bore having a temperature up to and above 400° F. comprise the steps of pumping a viscous aqueous foamed fracturing fluid into the subterranean zone at a rate and pressure sufficient to fracture the zone and recovering the fracturing fluid from the zone.

The viscous aqueous foamed fracturing fluids of the invention are basically comprised of water, a water viscosity increasing terpolymer of 2-acrylamido-2-methylpropane-sulfonic acid, acrylamide and acrylic acid or salts thereof, a gas, a foaming agent and a delayed viscosity breaker for effecting a controlled reduction in the viscosity of the fracturing fluid.

The water utilized in the fracturing fluids can be fresh water or salt water. The term "salt water" is used herein to mean unsaturated salt solutions including brine and sea water.

The water viscosity increasing terpolymer comprising 2-acrylamido-2-methylpropane-sulfonic acid (hereinafter also referred to as "AMPS®"), acrylamide and acrylic acid or salts thereof hydrates in the presence of water to form a gel that can be rapidly cross-linked by metal ions. The "AMPS®" is present in the terpolymer in an amount in the range of from about 15 weight % to about 80 weight %. The acrylamide is present therein in an amount in the range of from about 20 weight % to about 85 weight % and the acrylic acid or salts thereof are present in an amount in the range of from about 0.1 weight % to about 10 weight %. More preferably, the terpolymer is formed of 60 weight % of "AMPS®", 39.5 weight % of acrylamide and 0.5 weight % of acrylic acid or salts thereof. The terpolymer is generally included in the fracturing fluid in an amount in the range of from about 0.2% to about 2.0% by weight of water therein, more preferably in an amount of from about 0.5% to about 1.0% and most preferably about 0.75%.

While various gases can be utilized for foaming the viscous aqueous fracturing fluid of this invention, nitrogen, carbon dioxide and mixtures thereof are preferred. Of these, carbon dioxide is the most preferred. The gas is present in the viscous aqueous foamed fracturing fluid in an amount in the range of from about 5% to about 95% by volume of the water therein, more preferably in the range of from about 20% to about 70%.

Examples of foaming agents that can be utilized to foam and stabilize the viscous aqueous foamed fracturing fluid include, but are not limited to, $C_8$–$C_{22}$ alkylamidobetaines such as cocoamidopropyl betaine, alpha-olefin sulfonate, trimethyltallowammonium chloride, $C_8$–$C_{22}$ alkylethoxylate sulfate and trimethylcocoammonium chloride. Of these, cocoamidopropyl betaine is preferred. The foaming agent is generally present in the foamed fracturing fluid in an amount in the range of from about 0.1% to about 2.0% by weight of the water therein, more preferably in an amount of from about 0.2% to about 1.0% and most preferably about 0.6%.

In order to bring about a controlled reduction in the viscosity of the viscous aqueous foamed fracturing fluid after the fracturing fluid containing proppant particles has been placed in the formed fractures, a viscosity breaker is included in the foamed fracturing fluid. While a variety of breakers known to those skilled in the art can be utilized, a preferred breaker for use in accordance with the present invention is sodium bromate. When required, the sodium bromate breaker can be delayed by encapsulating it in a material which slowly releases the breaker in the fracturing fluid. Examples of encapsulating materials that can be used include, but are not limited to, particulate porous materials such as precipitated silica, alumina, zeolites, clays and hydrotalcites. Slowly permeable materials can also be utilized such as EPDM rubber, polyvinylidene chloride (PVDC), nylon, waxes, polyurethanes and cross-linked partially hydrolyzed acrylics. The viscosity breaker is present in the foamed fracturing fluid in an amount in the range of from about 0.005% to about 1.0% by weight of water therein, more preferably in an amount of from about 0.2% to about 0.5% and most preferably about 0.35%.

The viscous aqueous foamed fracturing fluid can optionally include a cross-linking agent for cross-linking the above described terpolymer and increasing the viscosity of the aqueous fluid. Examples of metal ions that can be used include titanium ions, zirconium ions, and hafnium ions. The metal ion is added to the fracturing fluid in the form of a metal ion releasing compound. Examples of the metal ion releasing compounds that can be utilized include, but are not limited to, titanium(IV)(triethanolaminato)isopropoxide, tetrakis(triethanolaminato)zirconium(IV) and hafnium(IV) acetylacetonate. Of these, the most preferred cross-linking metal ion releasing compound is tetrakis(triethanolaminato)zirconium(IV). When used, the metal ion releasing compound utilized is included in the fracturing fluid in an amount in the range of from about 0.02% to about 0.8% by weight of water therein, more preferably in an amount of from about 0.4% to about 0.6% and most preferably about 0.5%.

In order to achieve and maintain the viscosity of the viscous aqueous foamed fracturing fluid at its highest level, a pH buffer can optionally be included in the viscous aqueous foamed fracturing fluid. The buffer utilized should maintain the fracturing fluid pH in the range of from about 4 to about 6. While various buffers can be utilized, a particularly suitable buffer is an acetic acid-acetate buffer. When used, the buffer is included in the fracturing fluid in an amount in the range of from about 0.1% to about 1.0% by weight of water therein, more preferably in an amount of about 0.5%.

A method of the present invention for fracturing a subterranean zone penetrated by a well bore having a temperature up to and above 400° F. comprises the following steps. A viscous aqueous foamed fracturing fluid is pumped into the subterranean zone at a rate and pressure sufficient to fracture the zone. The viscous aqueous foamed fracturing fluid comprises water, a water viscosity increasing terpolymer of 2-acrylamido-2-methylpropane-sulfonic acid, acrylamide and acrylic acid or salts thereof, a gas, a foaming agent and a viscosity breaker for effecting a controlled reduction in the viscosity of the fracturing fluid. Thereafter, the fracturing fluid is recovered from the subterranean zone. The viscous aqueous foamed fracturing fluid can optionally include a cross-linking agent and a buffer for maintaining the pH of the fracturing fluid in the range of from about 4 to about 6. The components of the fracturing fluid utilized in accordance with the above described method are present in the same amounts as those described above.

A particularly suitable method of this invention for fracturing a subterranean zone penetrated by a well bore having a temperature up to and above 400° F. comprises the following steps. A viscous aqueous foamed fracturing fluid is pumped into the subterranean zone by way of the well bore at a rate and pressure sufficient to fracture the zone. The viscous aqueous foamed fracturing fluid comprises water, a terpolymer formed of 60 weight % of "AMPS®", 39.5 weight % of acrylamide and 0.5 weight % of acrylic acid or salts thereof present in the foamed fracturing fluid in an amount of about 0.75% by weight of water therein, a tetrakis(triethanolaminato)zirconium(IV) cross-linking agent present in the foamed fracturing fluid in an amount of about 0.5% by weight of water therein, a carbon dioxide gas present in the foamed fracturing fluid in an amount in the range of from about 20% to about 70% by volume of the water therein, a cocoamidopropyl betaine foaming agent present in the foamed fracturing fluid in an amount of about 1.0% by weight of water therein, a sodium bromate viscosity breaker present in the foamed fracturing fluid in an amount of about 0.1% by weight of water therein, and an acetic acid-acetate buffer present in the foamed fracturing fluid in an amount of about 0.5% by weight of water therein. Thereafter, the fracturing fluid is recovered from the subterranean zone.

A preferred method of this invention for fracturing a subterranean zone penetrated by a well bore having a temperature up to and above 400° F. comprises the steps of: (a) pumping a viscous aqueous foamed fracturing fluid into the subterranean zone at a rate and pressure sufficient to fracture the zone, the aqueous foamed fracturing fluid comprising water, a water viscosity increasing terpolymer of 2-acrylamido-2-methylpropane-sulfonic acid, acrylamide and acrylic acid or salts thereof, a gas, a foaming agent and a delayed viscosity breaker for effecting a controlled reduction in the viscosity of the fracturing fluid; and (b) recovering the fracturing fluid from the subterranean zone.

Another preferred method of this invention for fracturing a subterranean zone penetrated by a well bore having a temperature up to and above 400° F. comprises the steps of: (a) pumping a viscous aqueous foamed fracturing fluid into the subterranean zone at a rate and pressure sufficient to fracture the zone, the aqueous foamed fracturing fluid comprising water, a terpolymer of 60 weight % of 2-acrylamido-2-methylpropane-sulfonic acid, 39.5 weight % of acrylamide and 0.5 weight % of acrylic acid or salts thereof present in the foamed fracturing fluid in an amount of about 0.75% by weight of the water therein, carbon dioxide gas present in the foamed fracturing fluid in an amount of from about 20% to about 70% by volume of the water therein, a cocoamidopropyl betaine foaming agent present in the foamed fracturing fluid in an amount of about 0.6% by weight of the water therein and a sodium bromate viscosity breaker present in the foamed fracturing fluid in an amount of about 0.35% by weight of the water therein; and (b) recovering the fracturing fluid from the subterranean zone.

A preferred viscous aqueous foamed fracturing fluid of this invention for fracturing a subterranean zone penetrated by a well bore comprises: water; a terpolymer of 2-acrylamido-2-methylpropane-sulfonic acid, acrylamide and acrylic acid or salts thereof; a gas; a foaming agent; and a viscosity breaker for effecting a controlled reduction in the viscosity of the fracturing fluid.

Another preferred viscous aqueous foamed fracturing fluid of this invention for fracturing a subterranean zone penetrated by a well bore comprises: water; a terpolymer of 60 weight % of 2-acrylamido-2-methylpropane-sulfonic acid, 39.5 weight % of acrylamide and 0.5 weight % of acrylic acid or salts thereof present in the foamed fracturing fluid in an amount of about 0.75% by weight of the water therein; carbon dioxide gas present in the foamed fracturing fluid in an amount in the range of from about 20% to about 70% by volume of the water therein; a cocoamidopropyl betaine foaming agent present in the foamed fracturing fluid in an amount of about 0.6% by weight of the water therein; and a sodium bromate viscosity breaker present in the foamed fracturing fluid in an amount of about 0.35% by weight of the water therein.

In order to further illustrate the methods and fracturing fluids of the present invention, the following examples are given.

EXAMPLE

A viscous aqueous foamed fluid of the present invention (hereinafter referred to as "FOAMED FLUID A") having a viscosity of about 25 cP was prepared in the laboratory comprising water, a water viscosity increasing terpolymer of 60 weight % 2-acrylamido-2-methylpropane-sulfonic acid ("AMPS®"), 39.5 weight % acrylamide and 0.5 weight % of acrylic acid or salts thereof present in an amount of 0.45% by weight of the water, and a cocoamidopropyl betaine foaming agent present in an amount of 1.5% by weight of the water. Gas was added to the above water to generate a foam, the gas having a composition of 50% carbon dioxide, 20% nitrogen and 30% water.

A prior art aqueous foamed fluid (hereinafter referred to as "FOAMED FLUID B") having a viscosity of about 34 cP was prepared comprising water, a water viscosity increasing carboxymethylhydroxypropylguar polymer present in an amount of 0.48% by weight of the water, and a cocoamidopropyl betaine foaming agent present in an amount of 1.0% by weight of the water. Gas was added to the above water solution to generate a foam, the gas having a composition of 50% carbon dioxide, 20% nitrogen and 30% water.

Each of the viscous foamed fluids was placed and circulated in a recirculating flow loop viscometer wherein the viscosity of the fluid was continuously determined and plotted on a graph of viscosity versus temperature as the fluid was heated to about 300° F. The graph produced is shown in the drawing attached hereto.

As shown in the drawing, FOAMED FLUID A of this invention and FOAMED FLUID B of the prior art showed good stability to about 225° F. Thereafter, FOAMED FLUID B became unstable while FOAMED FLUID A continued to show very good stability to over 300° F. That is, as the temperature approached 300° F., the viscosity of FOAMED FLUID A exceeded the viscosity of FOAMED FLUID B and remained stable.

The recirculating flow loop viscometer utilized was limited in temperature to about 300° F. However, a stirring autoclave was used to qualitatively evaluate the foam stability of FOAMED FLUID A to a higher temperature. The results indicated that FOAMED FLUID A remained stable up to about 400° F. and depending on the particular foaming agent utilized will remain stable to as high as 500° F.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a subterranean zone penetrated by a well bore having a temperature up to and above 400° F. comprising:
   pumping a viscous aqueous foamed fracturing fluid into said subterranean zone at a rate and pressure sufficient to fracture said zone, said aqueous foamed fracturing fluid comprising:
   water,
   a water viscosity increasing terpolymer of 2-acrylamido-2-methylpropane-sulfonic acid, acrylamide and acrylic acid or salts thereof,
   a gas,
   a foaming agent and
   a viscosity breaker for effecting a controlled reduction in the viscosity of said fracturing fluid.

2. The method of claim 1 wherein said water is selected from the group consisting of fresh water and salt water.

3. The method of claim 1 wherein said acrylamido-2-methylpropane-sulfonic acid is present in said terpolymer in an amount in the range of from about 15 weight % to about 80 weight %, said acrylamide is present in an amount in the range of from about 20 weight % to about 85 weight % and said acrylic acid or salts thereof are present in an amount of from about 0.1 weight % to about 10 weight %.

4. The method of claim 1 wherein said 2-acrylamido-2-methylpropane-sulfonic acid is present in said terpolymer in an amount of about 60 weight %, said acrylamide is present in an amount of about 39.5 weight % and said acrylic acid or salts thereof are present in an amount of about 0.5 weight %.

5. The method of claim 1 wherein said terpolymer is present in said foamed fracturing fluid in an amount in the range of from about 0.2% to about 2.0% by weight of said water therein.

6. The method of claim 1 wherein said gas is selected from the group consisting of nitrogen, carbon dioxide and mixtures thereof.

7. The method of claim 1 wherein said gas is carbon dioxide.

8. The method of claim 1 wherein said gas is present in said foamed fracturing fluid in an amount in the range of from about 5% to about 95% by volume thereof.

9. The method of claim 1 wherein said foaming agent is selected from the group consisting of $C_8$–$C_{22}$ alkylamidobetaine, alpha-olefin sulfonate, trimethyltallowammonium chloride, $C_8$–$C_{22}$ alkylethoxylate sulfate and trimethylcocoammonium chloride.

10. The method of claim 1 wherein said foaming agent is cocoamidopropyl betaine.

11. The method of claim 1 wherein said foaming agent is present in said foamed fracturing fluid in an amount in the range of from about 0.1% to about 2.0% by weight of said water therein.

12. The method of claim 1 wherein said viscosity breaker comprises sodium bromate.

13. The method of claim 1 wherein said viscosity breaker comprises encapsulated sodium bromate.

14. The method of claim 1 wherein said viscosity breaker is present in said foamed fracturing fluid in an amount in the range of from about 0.005% to about 1.0% by weight of water therein.

15. The method of claim 1 wherein said foamed fracturing fluid further comprises a cross-linking agent selected from the group consisting of titanium(IV)(triethanolaminato)-isopropoxide, tetrakis(triethanolaminato)zirconium(IV) and hafnium(IV)acetylacetonate.

16. The method of claim 15 wherein said cross-linking agent is tetrakis(triethanolaminato)zirconium(IV).

17. The method of claim 15 wherein said cross-linking agent is present in said foamed fracturing fluid in an amount in the range of from about 0.02% to about 0.8% by weight of said water therein.

18. The method of claim 1 wherein said foamed fracturing fluid further comprises a buffer for maintaining the pH of said fracturing fluid in the range of from about 4 to about 6.

19. The method of claim 18 wherein said buffer comprises an acetic acid-acetate buffer.

20. The method of claim 18 wherein said buffer is present in said foamed fracturing fluid in an amount in the range of from about 0.1% to about 1.0% by weight of said water therein.

21. A method of fracturing a subterranean zone penetrated by a well bore having a temperature up to and above 400° F. comprising:
   pumping a viscous aqueous foamed fracturing fluid into said subterranean zone at a rate and pressure sufficient to fracture said zone, said aqueous foamed fracturing fluid comprising:
   water,
   a terpolymer of 2-acrylamido-2-methylpropane-sulfonic acid present in an amount in the range of from about 15 weight % to about 80 weight %, acrylamide present in an amount in the range of from about 20 weight % to about 85 weight % and acrylic acid or salts thereof present in an amount of from about 0.1 weight % to about 10 weight %, wherein said terpolymer is present in said foamed fracturing fluid in an amount in the range of from about 0.2% to about 2.0% by weight of said water therein,
   carbon dioxide gas present in said foamed fracturing fluid in an amount of from about 20% to about 70% by volume of said foamed fracturing fluid,
   a cocoamidopropyl betaine foaming agent present in said foamed fracturing fluid in an amount in the range of from about 0.1% to about 2.0% by weight of said water therein and
   a sodium bromate viscosity breaker present in said foamed fracturing fluid in an amount in the range of from about 0.005% to about 1.0% by weight of said water therein.

22. The method of claim 21 wherein said foamed fracturing fluid further comprises a tetrakis(triethanolaminato) zirconium(IV) cross-linking agent present in said foamed fracturing fluid in an amount in the range of from about 0.02% to about 0.8% by weight of said water therein.

23. The method of claim 22 wherein said foamed fracturing fluid further comprises an acetic acid-acetate buffer present in said foamed fracturing fluid in an amount in the range of from about 0.1% to about 1.0% by weight of said water therein.

24. A viscous aqueous foamed fracturing fluid comprising:
   water;
   a terpolymer of 2-acrylamido-2-methylpropane-sulfonic acid, acrylamide and acrylic acid or salts thereof;
   a gas;
   a foaming agent; and
   a viscosity breaker for effecting a controlled reduction in the viscosity of said fracturing fluid.

25. The fracturing fluid of claim 24 wherein said water is selected from the group consisting of fresh water and salt water.

26. The fracturing fluid of claim 24 wherein said acrylamido-2-methylpropane-sulfonic acid is present in said terpolymer in an amount in the range of from about 15 weight % to about 80 weight %, said acrylamide is present in an amount in the range of from about 20 weight % to about 85 weight % and said acrylic acid or salts thereof are present in an amount of from about 0.1 weight % to about 10 weight %.

27. The fracturing fluid of claim 24 wherein said 2-acrylamido-2-methylpropane-sulfonic acid is present in said terpolymer in an amount of about 60 weight %, said acrylamide is present in an amount of about 39.5 weight % and said acrylic acid is present in an amount of about 0.5 weight %.

28. The fracturing fluid of claim 24 wherein said terpolymer is present in said foamed fracturing fluid in an amount in the range of from about 0.2% to about 2.0% by weight of said water therein.

29. The fracturing fluid of claim 24 wherein said gas is selected from the group consisting of nitrogen, carbon dioxide and mixtures thereof.

30. The fracturing fluid of claim 24 wherein said gas is carbon dioxide.

31. The fracturing fluid of claim 24 wherein said gas is present in said foamed fracturing fluid in an amount in the range of from about 5% to about 95% by volume thereof.

32. The fracturing fluid of claim 24 wherein said foaming agent is selected from the group consisting of $C_8$–$C_{22}$ alkylamidobetaine, alpha-olefin sulfonate, trimethyltallowammonium chloride, $C_8$–$C_{22}$ alkylethoxylate sulfate and trimethylcocoammonium chloride.

33. The fracturing fluid of claim 24 wherein said foaming agent is cocoamidopropyl betaine.

34. The fracturing fluid of claim 24 wherein said foaming agent is present in said foamed fracturing fluid in an amount in the range of from about 0.1% to about 2.0% by weight of said water therein.

35. The fracturing fluid of claim 24 wherein said viscosity breaker comprises sodium bromate.

36. The fracturing fluid of claim 24 wherein said viscosity breaker comprises encapsulated sodium bromate.

37. The fracturing fluid of claim 24 wherein said viscosity breaker is present in said foamed fracturing fluid in an amount in the range of from about 0.005% to about 1.0% by weight of water therein.

38. The fracturing fluid of claim 24 wherein said foamed fracturing fluid further comprises a cross-linking agent selected from the group consisting of titanium(IV)(triethanolaminato)-isopropoxide, tetrakis(triethanolaminato)zirconium(IV) and hafnium(IV)acetylacetonate.

39. The fracturing fluid of claim 38 wherein said cross-linking agent is tetrakis(triethanolaminato)zirconium(IV).

40. The fracturing fluid of claim 38 wherein said cross-linking agent is present in said foamed fracturing fluid in an amount in the range of from about 0.02% to about 0.8% by weight of said water therein.

41. The fracturing fluid of claim 24 wherein said foamed fracturing fluid further comprises a buffer for maintaining the pH of said fracturing fluid in the range of from about 4 to about 6.

42. The fracturing fluid of claim 41 wherein said buffer comprises an acetic acid-acetate buffer.

43. The fracturing fluid of claim 41 wherein said buffer is present in said foamed fracturing fluid in an amount in the range of from about 0.1% to about 1.0% by weight of said water therein.

44. A viscous aqueous foamed fracturing fluid comprising:

water;

a terpolymer of 2-acrylamido-2-methylpropane-sulfonic acid present in an amount in the range of from about 15 weight % to about 80 weight %, acrylamide present in an amount in the range of from about 20 weight % to about 85 weight % and acrylic acid or salts thereof present in an amount of from about 0.1 weight % to about 10 weight %, wherein said terpolymer is present in said foamed fracturing fluid in an amount in the range of from about 0.2% to about 2.0% by weight of said water therein;

carbon dioxide gas present in said foamed fracturing fluid in an amount in the range of from about 20% to about 70% by volume thereof;

a cocoamidopropyl betaine foaming agent present in said foamed fracturing fluid in an amount in the range of from about 0.1% to about 2.0% by weight of said water therein; and a sodium bromate viscosity breaker present in said foamed fracturing fluid in an amount of about in the range of from about 0.005% to about 1.0% by weight of said water therein.

45. The viscous aqueous foamed fracturing fluid of claim 44 which further comprises a tetrakis(triethanolaminato)zirconium(IV) cross-linking agent present in said foamed fracturing fluid in an amount in the range of from about 0.02% to about 0.8% by weight of said water therein.

46. The viscous aqueous foamed fracturing fluid of claim 45 which further comprises an acetic acid-acetate buffer present in said foamed fracturing fluid in an amount in the range of from about 0.1% to about 1.0% by weight of said water therein.

* * * * *